United States Patent [19]
Archibald

[11] 3,869,463

[45] Mar. 4, 1975

[54] N-PHENYL DERIVATIVES OF ALKANOYLAMIDO PIPERIDINES

[75] Inventor: John Leheup Archibald, Windsor, England

[73] Assignee: John Wyeth & Brother Limited, Maidenhead, Berkshire, England

[22] Filed: Jan. 17, 1973

[21] Appl. No.: 324,462

[52] U.S. Cl.. 260/293.61, 260/256.4 R, 260/287 R, 260/293.57, 260/293.58, 260/293.62, 260/293.69, 260/293.77, 260/294.8 C, 260/295 T, 260/295 Q, 260/295.5 T, 260/295.5 A, 424/251, 424/258, 424/263, 424/267
[51] Int. Cl............................................. C07d 31/42
[58] Field of Search..... 260/293.61, 293.62, 293.69, 260/293.77, 295 Q, 295.5 A

[56] References Cited
UNITED STATES PATENTS

| | | | |
|---|---|---|---|
| 3,161,637 | 12/1964 | Janssen | 260/247.2 |
| 3,171,838 | 3/1965 | Janssen | 260/293.4 |
| 3,238,215 | 3/1966 | Zenitz | 260/293 |
| 3,527,761 | 9/1970 | Archibald et al. | 260/293 |
| 3,655,674 | 4/1972 | Archibald | 260/293.61 |

*Primary Examiner*—G. Thomas Todd

[57] ABSTRACT

The invention provides N-phenyl, N-alkanoylpiperidines which have an alkylene or hydroxy or keto alkylene radical attached to the nitrogen of the piperidine ring said alkylene group having a cyclic substituent selected from 1,2,3,4-tetrahydronaphthyl, indenyl, idolyl, benzo(b)-thienyl, pyrimidinyl, quinolyl, benzo-1,4-dioxanyl and benzindolyl with the proviso that when a hydroxy or keto alkylene radical is present the cyclic substituent may also be selected cycloalkyl containing from five to seven carbon atoms or a phenyl radical and said cyclic substituents may be substituted. The compounds exhibit one or more of the following pharmacological activities, analgesic activity, anti-oxotremorine activity, hypotensive activity, anti-inflammatory activity, CNS activity or blood platelet aggregation or are intermediates for such compounds.

4 Claims, No Drawings

N-PHENYL DERIVATIVES OF ALKANOYLAMIDO PIPERIDINES

The invention relates to novel heterocyclic compounds, to processes for preparing them and to pharmaceutical compositions containing them.

The present invention provides novel heterocyclic compounds of the general formula:

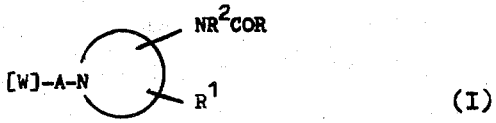

wherein

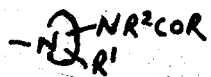

represents a ring system of the formula:

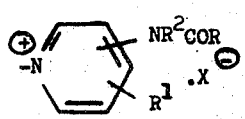 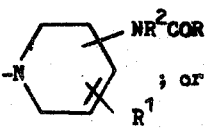

A represents a direct bond or a lower-alkylene radical, a mono- or di-keto lower-alkylene radical, a hydroxy-lower-alkylene radical, or a radical

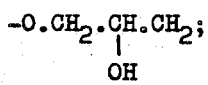

or O-(lower-alkylene)-

W represents any one of the following radicals, 1,2,3,4-tetrahydro-naphthyl (for example 1,2,3,4-tetrahydronaphth 6-yl), naphthyl, indenyl, indolyl, benzo[b]thienyl (for example 3-benzo[b]thienyl), piperidyl, pyrimidinyl (for example 4-pyrimidinyl), quinolyl (for example 2-quinolyl), benzo-1,4-dioxanyl (for example benzo-1,4-dioxan-2-yl and benzindolyl in particular benz[g]indolyl (for example 3-benz[g] indolyl), any of which radicals may be substituted or unsubstituted, and when A is other than lower-alkylene W may represent a cycloalkyl radical containing five to seven ring carbon atoms, or a phenyl radical or pyridyl, R represents a substituted or unsubstituted aryl-lower-alkyl, cycloalkyl containing from five to seven ring carbon atoms or lower-alkyl radical, $R^1$ represents hydrogen, or lower alkyl, $R^2$ represents an aryl group which may be substituted and $X^-$ denotes an anion, and the acid addition and quaternary ammonium salts of those compounds wherein:

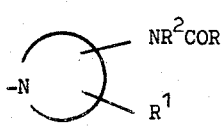

is a ring system of formula II(b) or II(c).

The invention also includes the anhydrous forms and the hydrates of the above compounds.

It is to be understood that the term "alkylene" used herein includes both straight and branched chain radicals, the term "lower" when prefixing a radical means the radical concerned contains one to six carbon atoms, (although those containing one to four carbon atoms are preferred). By the term "aryl" or "heteroaryl radical" is meant a radical possessing aromatic character.

The compounds of formula (I) exhibit pharmacological activity for example one or more of the following activities, analgesic activity, anti-oxotremorine activity, hypotensive activity, anti-inflammatory activity, central nervous system activity e.g., depressant activity when tested on warm-blooded animals, or blood platelet aggregation inhibition.

In addition to having useful pharmaceutical properties as mentioned above the novel compounds of the invention are intermediates for the preparation of other compounds of formula I.

Examples of substituents for the W radicals are: halogen (for example fluorine, chlorine or bromine), lower alkyl (for example methyl, ethyl, propyl, or butyl), lower alkoxy (for example methoxy, ethoxy, propoxy or butoxy), nitro, amino (including alkyl or dialkyl substituted amine groups) in particular dialkylamino (for example dimethylamino or diethylamino), acylamino in particular alkanoylamino [for example acetylamino (acetamido)], hydroxy, carboxyl, lower alkoxycarbonyl, alkylenedioxy (for example methylenedioxy), trihaloalkyl (for example trifluoromethyl), mercapto, methylthio, methylsulphonyl, phenyl and phenyl substituted by one or more of these substituents mentioned immediately above.

When A is other than lower alkylene, further aryl and heteroaryl radicals for W include phenyl, pyridyl (for example 2 and 4 pyridyl).

Examples of A are methylene, ethylene, propylene, butylene, oxoethylene, oxalyl, oxo-propylene, hydroxyethylene and hydroxypropylene. Examples of $R^1$ are hydrogen, and lower alkyl (for example methyl, ethyl, propyl and butyl).

Examples of R are benzyl, phenethyl, cyclopentyl, cyclohexyl, cycloheptyl, methyl, ethyl, propyl and butyl.

Examples of $R^2$ are substituted and unsubstituted phenyl and naphthyl groups. The substituents when present may be any of those specified above for W.

Examples of acid addition salts are those formed from inorganic and organic acids in particular pharmaceutically acceptable acid addition salts such as the sulphate, hydrochloride, hydrobromide, hydro-iodide, nitrate, phosphate, sulphonate (such as the methanesulphonate and p-toluene-sulphonate), acetate, maleate, fumarate, tartrate and formate.

The quaternary ammonium salts of the compounds of formula I where the quaternising group is one which can be removed under mild conditions e.g., by hydrogenolysis are valuable intermediates for the preparation of other compounds of formula I. Preferred quaternary ammonium salts are those of formula (III)

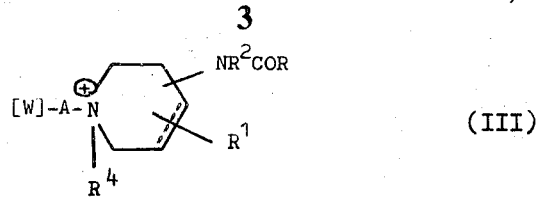

where the dotted line denotes an optional double bond and $R^4$ is an arylmethyl radical, e.g., trityl or benzyl, $X^-$ is an anion, e.g. a halide ion, and [W], A, R, $R^1$ and $R^2$ are as defined in connection with formula (I).

A preferred class of compounds according to the invention are those of the general formula:

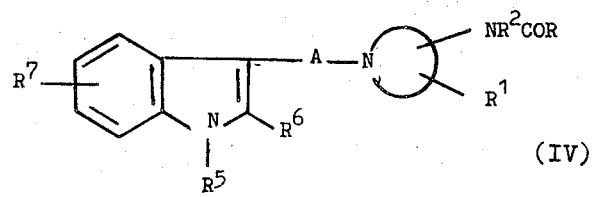

in which

represents a ring system of general formula IIa, IIb, or IIc as defined above, A, R, $R^1$ and $R^2$ are as defined above, $R^5$ represents hydrogen, lower alkyl, lower aralkyl or aroyl, $R^6$ represents hydrogen, lower alkyl or aryl, $R^7$ represents hydrogen, halogen, lower alkoxy, hydroxy or lower alkyl, and the acid addition and quaternary ammonium salts of those compounds wherein

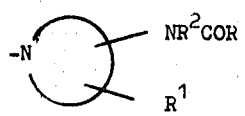

has the formula IIb or IIc.

Examples or $R^5$ are hydrogen, methyl, ethyl, n-propyl, isopropyl, n-butyl, isobutyl, benzyl, benzoyl, and p-chlorobenzoyl, $R^6$ can be for example hydrogen, methyl, ethyl, n-propyl, isopropyl, n-butyl, isobutyl or substituted or unsubstituted phenyl and is preferably hydrogen or methyl. $R^7$ can be, for example, hydrogen, chlorine, methoxy, ethoxy, hydroxy, methyl, ethyl, n-propyl, isopropyl, n-butyl, or isobutyl. Preferably $R^3$ is hydrogen atom.

The compounds of general formula (I) can be prepared in a number of ways by building up the molecule from suitable starting materials in known manner. Such processes applied to the preparation of the novel compounds of formula (I) are included in the scope of the invention.

One method of preparing compounds of formula (I) comprises acylating a compound of the formula (V)

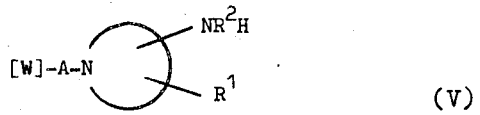

with either a reactive derivative of an acid of general formula R.COOH (where R is as defined above). As a reactive derivative of the acid of formula R.COOH used in the process described above, a halide (for example the chloride or bromide) or an anhydride is preferred. Other examples of reactive derivatives of the acid R.COOH which may be used are the acid azide, mixed anhydride and active esters. Furthermore the compounds of formula (I) may also be prepared by treating a compound of formula (V) with the acid R.COOH in the presence of a known condensing agent (for example, a carbodiimide), or by first activating the amino function (for example, by forming the phosphazoderivative) and then reacting with the acid R.COOH. In connection with the introduction of the —COR group into a compound of formula (V) reference may be made to "Chemistry of the Amino Acids" by Greenstein and Winitz (John Wiley & Sons. Inc., Publishers, 1961) at pages 782–883 and 943–1108.

Compounds of formula (V) where [W] is indolyl, which may be substituted, are novel compounds which are included within the scope of the invention.

Most of the starting materials of formula (V) wherein [W] is other than an indolyl radical may be prepared by methods described in the complete specification accompanying our British Application 42090/70 and 34376/71. Compounds in which [W] is a substituted or unsubstituted indolyl radical may be prepared by methods analogous to those for preparing the other compounds of formula V. Other starting materials may be prepared by standard methods.

A method of preparing the novel compounds of formula (V) wherein [W] is a substituted or unsubstituted indolyl radical comprises reducing a corresponding compound wherein $R^2$ is an acyl group. For instance a compound of formula (V) wherein $R^2$ is benzoyl may be reduced to a compound of formula (V) wherein $R^2$ is benzyl and a compound of formula (V) wherein $R^2$ is carbethoxy ($CO_2Et$) may be reduced to a compound wherein $R^2$ is $CH_3$. A suitable reducing agent is a hydride transfer agent e.g., lithium aluminium hydride. If the ring system

is unsaturated then this may be reduced at the same time.

A second method of preparing the compounds of formula (I), comprises reacting a compound of the general formula:

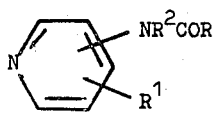

(VIa)

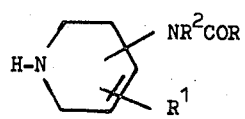

(VIb)

or

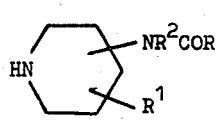

(VIc)

with an alkylating or acylating agent of general formula (VII)

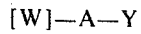

(VII)

(wherein R, R$^1$, R$^2$ and W have the meanings given in connection with formula (I) ), A is as defined in connection with formula (I) and Y is a halogen atom or an equivalent replaceable atom or radical for example an organic sulphonyl radical such as a tosyl radical.

Alternatively the compounds of formula VI*b* or VI*c* may be reacted with (i) a compound of formula

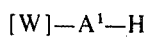

(VIII)

wherein the chain A$^1$ contains an epoxide residue for example

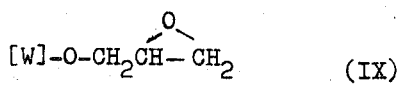

(IX)

to give a compound of formula (I) wherein the chain A is substituted by a hydroxyl radical or (ii) a vinyl substituted compound of formula

(X)

wherein B is a straight or branched chain alkylene radical, preferably a vinyl radical, to give a corresponding compound of formula (I) wherein A is a straight of branched chain alkylene radical.

The compounds of general formulae (VII), (VIII), (IX) and (X) are known compounds or can be made following methods known for preparing compounds of these types. The starting materials of general formulae VI*a*, VI*b*, and VI*c* can generally be made by acylating a corresponding amino compound of general formula:

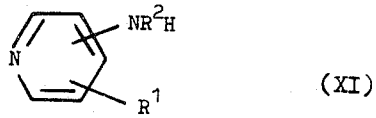

(XI)

and if necessary reducing the ring system to the corresponding tetrahydropyridine or piperidine ring.

A further method of preparing compounds of formula (I), in which

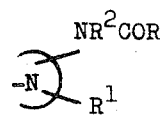

represents a ring system of formula II*b* or II*c* and A is a lower alkylene or a mono or di-keto lower alkylene radical comprises a Mannich reaction using formaldehyde, a compound of formula VI*b* or VI*c* as secondary amine and either a compound WH (wherein W has the meanings already defined and thus WH can be considered as a compound formed by addition of a hydrogen atom to the radical W; said compound WH also containing a suitable reactive site of the type known in the literature to participate in the Mannich reaction), or a derivative of W in which the chain A has already been formed, and which partially formed chain contains a site of the type known in the literature to participate in the Mannich reaction. Examples of the latter type of derivative are [W]—CH$_3$ and [W]—CO.CH$_3$ which derivatives are known compounds or can be made following the methods known for preparing compounds of these types. The aldehyde used in the above reaction may be acetaldehyde or formaldehyde which may be in the form of a solution in an inert solvent as paraformaldehyde, metaldehyde or any other polymeric form or gaseous formaldehyde.

The compounds of general formula (I) may be prepared by starting with a compound of formula:

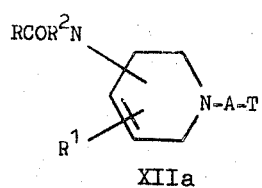 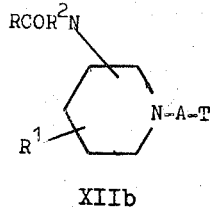

XIIa                    XIIb wherein T is a known precursor group of W and reacting with another molecule of the type known in the literature for the formation of W. Reference may be made in this connection to standard textbooks of Organic Chemistry such as: Organic Chemistry by Paul Karrer (Elsevier Publishing Company, Inc., 1950); Organic Chemistry by Fieser & Fieser (Reinhold Publishing Corporation, 1956); Chemistry of Carbon Compounds by Rodd (Elsevier, Amsterdam, 1951–1969); Heterocyclic Compounds edited by Elderfield (John Wiley & Sons, Inc., 1950–1968); and Chemistry of the Heterocyclic Compounds edited by Weissberger (Interscience, 1954). As examples of T may be mentioned —COOAlkyl, —CO.CH$_2$—OH and —CH$_2$.CH(OAlkyl)$_2$ where Alkyl represents a lower alkyl radical. As examples of reactants known to react with T may be mentioned, o-phenylenediamine, 1-naphthyl-hydrazine or a mixture of formaldehyde and ammonia. The compounds of formula XII*a* or XII*b* may be made following methods known in the art for the preparation of similar compounds.

A still further process for the preparation of compounds of general formula (I) in which:

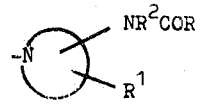

represents a ring system of formula IIb or IIc, W, R, R¹ and R² have the meanings defined in connection with formula (I) and A is a lower alkylene radical comprises reacting a compound of general formula (XV)

[W]—A—OH (XV)

(in which W and A have the meanings defined immediately above) with a compound of formula Vb or Vc (in which R, R¹ and R² have the meanings defined immediately above).

The reaction is preferably carried out in the presence of a catalyst, for example Raney Nickel. An organic solvent, which is inert under the reaction conditions, is usually used for example exylene, toluene or benzene. Preferably the reaction is carried out by heating the reactants under reflux in a water-immiscible organic solvent, for example xylene, and removing the water formed during the reaction by azetropic distillation. If necessary, reactive substituent groups can be blocked during a reaction and released later.

In order to prepare a compound of formula (I) wherein A is a mono-keto lower-alkylene radical of formula —CO.(CH₂)$_{\overline{m}}$ in which $m$ is from 1 to 5, a compound of formula:

[W]—H (XVI)

can be acylated (Friedel-Crafts) with an acid halide of formula:

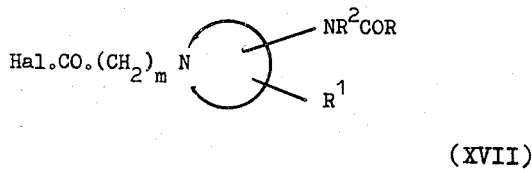

(XVII)

For details of the reaction reference may be made to "The Friedel-Crafts and related reactions" by G. A. Olah Vol.3 (Interscience Publishers 1964).

Certain compounds of formula (I) may also be prepared by treating a compound of formula (III) as defined above under mild conditions such as to remove the group R⁴. Preferably the group R⁴ is removed by hydrogenolysis under standard conditions, e.g., using an appropriate catalyst such as a palladium on carbon catalyst, a platinum catalyst or a nickel catalyst. In this reaction a mono or diketo lower alkylene radical A may also be reduced to a corresponding hydroxy lower alkylene radical A. If the keto compound is desired it can be obtained by oxidation of the final product. When hydrogenolysis is used to remove the group R⁴ and the optional double bond is present in the heterocyclic ring (i.e., a tetrahydropyridine compound is used) this double bond will be reduced so that the final product is a piperidine compound of formula (I). If a compound of formula (I) in which the optional double bond is present is desired this can be obtained by treating compound (III) under other conditions effective to remove R⁴ without saturating the double bond.

Instead of a compound of formula (III) wherein R⁴ is as defined above any other starting material where R⁴ is an organic group which can be readily removed under mild conditions can be used.

Other conditions which may be effective to remove the group R⁴ are treatment with acid e.g., with acetic acid or hydrochloric acid to remove a trityl group or treatment with alkali metal in liquid ammonia.

The preferred groups R⁴ in the starting material of formula (III) are arylmethyl radicals such as benzyl, diphenylmethyl, trityl or naphthylmethyl.

Compounds of formula (I) in which [W] is a substituted or unsubstituted indolyl radical for example compounds of formula

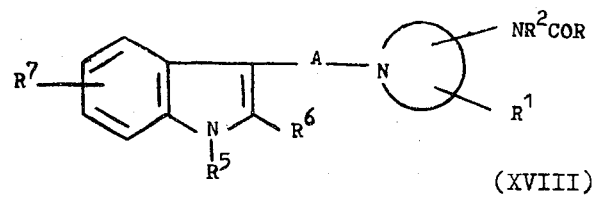

(XVIII)

wherein R, R¹, R² and A are as defined in connection with formula I, R⁵ represents hydrogen, lower alkyl, lower aralkyl or aroyl, R⁶ represents hydrogen, lower alkyl, or aryl, R⁷ represents hydrogen, halogen, lower alkoxy, hydroxy or lower alkyl, may also be prepared by carrying out a Fischer indole synthesis on a compound of general formula:

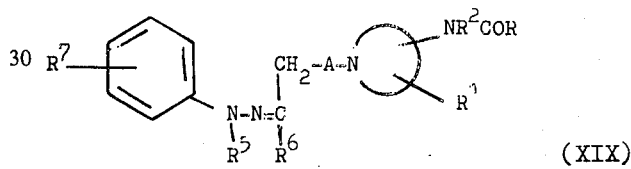

(XIX)

wherein R, R¹, R², R⁵, R⁶, R⁷ and A are as defined immediately above.

The starting material can be prepared by condensing a phenyl hydrazine of formula:

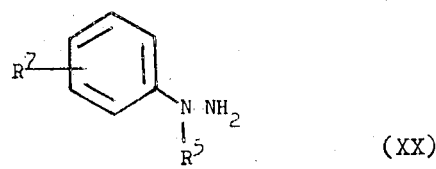

(XX)

with an aldehyde or ketone of general formula:

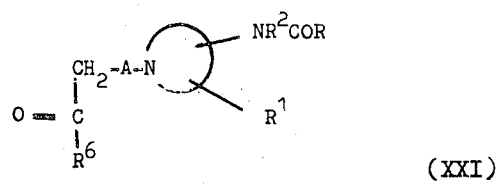

(XXI)

in which formulae R, R¹, R², R⁵, R⁶, R⁷ and A are as defined above. The compounds of formula (IV) wherein [W] is a substituted or unsubstituted indolyl radical may also be prepared by a Fischer indole synthesis analogous to that just described.

The reactions outlined above usually are carried out in a solvent which is inert under the reaction conditions.

The most suitable solvent system is chosen and varies depending on the particular reactants being employed.

If necessary heating the reactants in solution under reflux can be carried out, and if necessary heating under high pressures may also be used.

Once a compound of general formula (I) has been prepared, then if necessary one or more substituents in the molecule may be converted to another substituent each within its own meaning specified in connection with formula (I). If a compound is produced in which

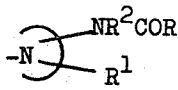

represents the pyridine ring system of formula II(a), this may be selectively reduced to one of the other ring system of lower oxidation state. For example, reduction with an alkali metal borohydride gives the tetrahydro pyridine ring system of formula II(b). On the other hand, catalytic hydrogenation, for example, in the presence of Raney nickel or a platinum catalyst, or careful reduction with a hydride transfer agent (such as lithium aluminum hydride) gives rise to the piperidine ring system of formula II(c). Similarly if a compound of formula (I) is prepared in which

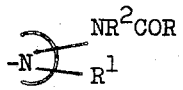

represents the tetrahydropyridine ring system of formula II(b), this may also be reduced to the piperidine ring system of formula II(c).

If a compound of formula (I) is prepared in which the chain A contains one or more carbonyl functions, then this chain may be selectively reduced. For example, when A is the oxalyl residue —CO.CO—, this may be reduced under mild conditions such as by a hydride transfer agent (particularly lithium aluminium hydride) to give the

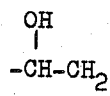

residue. When A is the —CO—CH₂—residue this may be reduced with an alkali metal borohydride to give the

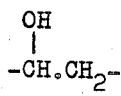

residue. When the oxalyl residue is reduced under more drastic conditions, the ethylene chain —CH₂—CH₂— results.

A compound of formula I may be hydrolysed to remove the COR group and the product may then be acylated to give a compound of formula I with a different COR group.

When a compound of formula (I) is produced wherein the radical W has one or more methoxy substituents demethylation to the corresponding hydroxyl compound may be brought about in known manner. Furthermore, if the radical W has a nitro substituent this may be reduced in known manner to the corresponding amino compound which in turn may be further acylated to alkylated.

If necessary, in any of the reaction hereinbefore described, reactive substituent groups may be blocked during a reaction and released at a later stage. As already indicated the novel tetrahydropyridine and piperidine compounds provided by the invention contain a basic nitrogen atom and thus can form acid addition salts with acids (particularly pharmaceutically acceptable acids) or quaternary ammonium salts, for example with alkyl halides or aralkyl halides (particularly methyl iodide or benzyl chloride or bromide). The acid addition salts may either be formed in situ during the hereinbefore described processes and isolated therefrom or a free base may be treated with the appropriate acid in the presence of a suitable solvent and then the salt isolated. The quaternary salts may be prepared by treating the free base with the appropriate halide in the presence or absence of a solvent.

The invention also includes pharmaceutical compositions containing as active ingredient a compound of formula I as above defined, or a novel compound of formula (IV) wherein [W] is a substituted or unsubstituted indolyl radical, as above defined. The active compound may be micronised if desired. In addition to the active ingredient, the compositions also contain a non-toxic carrier. Any suitable carrier known in the art can be used to prepare the pharmaceutical compositions. In such a composition, the carrier may be a solid, liquid or mixture of a solid and a liquid. Solid form compositions include powders, tablets and capsules. A solid carrier can be one or more substances which may also act as flavouring agents, lubricants, solubilisers, suspending agents, binders, or tablet-distintgrating agents; it can also be an encapsulating material. In powders the carrier is a finely divided solid which is in admixture with the finely divided active ingredient. In tablets the active ingredient is mixed with a carrier having the necessary binding properties in suitable proportions and compacted in the shape and size desired. The powders and tablets preferably contain from 5 to 99, preferably 10–80 percent of the active ingredient. Suitable solid carriers are magnesium carbonate, magnesium stearate, talc, sugar, lactose, pectin, dextrin, starch, gelatin, tragacanth, methyl cellulose, sodium carboxymethyl cellulose, a low melting wax, and cocoa butter. The term "composition" is intended to include the formation of an active ingredient with encapsulating material as carrier to give a capsule in which the active ingredient (with or without other carriers) is surrounded by carrier, which is thus in association with it. Similarly cachet are included.

Sterile liquid form compositions include sterile solutions, suspensions, emulsions, syrups and elixirs. The active ingredient can be dissolved or suspended in a pharmaceutically acceptable sterile liquid carrier, such as sterile water, sterile organic solvent or a mixture of both. Preferably a liquid carrier is one suitable for parenteral injection. Where the active ingredient is sufficiently soluble it can be dissolved in normal saline as a carrier, if it is too insoluble for this it can often be dissolved in a suitable organic solvent, for instance aqueous propylene glycol or polyethylene glycol solutions. Aqueous propylene glycol containing from 10 to 75 percent of the glycol by weight is generally suitable. In other instances compositions can be made by dispersing the finely divided active ingredient in aqueous starch or sodium carboxymethyl cellulose solution, or in a suitable oil, for instance arachis oil. Liquid pharmaceutical compositions which are sterile solutions or suspensions can be utilised by intramuscular, intraperitoneal or subcutaneous injection. In many instances a compound is orally active and can be administered orally either in liquid of solid composition form.

Preferably the pharmaceutical composition is in unit dosage form. In such form, the composition is subdivided in unit doses containing appropriate quantities of the active ingredient; the unit dosage form can be a packaged composition, the package containing specific quantities of compositions, for example packeted powders or vials or ampoules. The unit dosage form can be a capsule, cachet or tablet itself, or it can be the appropriate number of any of these in package form. The quantity of active ingredient in a unit dose of composition may be varied or adjusted from 5 mg. or less to 500 or more, according to the particular need and the activity of the active ingredient. The invention also includes the compounds in the absence of carrier where the compounds are in unit dosage form.

The following non-limiting Examples illustrate the invention:

EXAMPLE 1

1-[2-Oxo-2-(1-methyl-indol-3-yl)-ethyl]-4-(N-propionanilide-piperidine

3-Chloroacetyl-1-methylindole (1.05 g.) and N-(4-piperidyl)-propionanilide (1.16 g.) were stirred together at room temperature in dimethylformamide (25 ml.) and triethylamine (0.8 ml.) for seventeen hours. The reaction mixture was filtered and the filtrate was poured into ice-cooled water (700 ml.) to give the title compound (1.5 g., m.p. 148°–50°C) as the insoluble material.
Analysis:Found: 74.0% C, 7.2%H, 10.1%N.
$C_{25}H_{29}N_3O_2$ requires: 74.4%C, 7.3%H, 10.4%N.

EXAMPLE 2

1-(2-Oxo-2-indol-3-yl-ethyl)-4-(N-propionanilido)-piperidine

3-Bromoacetylindole (2.38 g.) and N-(4-piperidyl)-propionanilide (2.3 g.) were stirred together at room temperature in dimethylformamide (50 ml.) and triethylamine (1.6 ml.) for 17 hours. The reaction mixture was then filtered and the precipitate stirred with water (100 ml.) for one hour leaving the title compound (0.87 g., m.p. 172°–4°C with decomposition) as the insoluble material.
Analysis:Found: 73.7%C, 7.0%H, 10.7%N.
$C_{24}H_{27}N_3O_2$ requires: 74.0%, 7.0%H, 10.8%N.

EXAMPLE 3

1-[2-(2-Methyl-indol-3-yl)-ethyl]-4-(N-propionanilido)-piperidine 3-(2-Bromoethyl)-2-methyl-indole (7.34 g.) and N-(4-piperidyl)-propionanilide (7.2 g.) were stirred together in dimethylformamide (50 ml) and triethylamine (5 ml.) for six days, in the dark, at room temperature. The reaction mixture was filtered and the filtrate poured into ice-water (500 ml.) which was then extracted with ether, (3 × 100 ml.) which was washed with water (100 ml.), and dried over magnesium sulphate monohydrate. Addition of N-hydrochloric acid (100 ml.) to the ether fraction caused a solid to separate and so the ether and this precipitate were extracted into water (5 × 100 ml.). This aqueous fraction, on acidification with dilute hydrochloric acid (100 ml.), gave the hydrochloride of the title compound (1.6 g., m.p. 156°–8°C) as a precipitate.
Analysis: Found: 67.4%C, 7.8%H, 9.3%N. $C_{25}H_{31}N_3O$. $HCl.H_2O$ requires: 67.6%C, 7.7%H, 9.5%N.

EXAMPLE 4

1-(3-Propylindol-3-yl)-4-(N-propionanilido)-piperidine

3-[3-(p-Toluenesulphonyl)-propyl]-indole (2.32 g.) and N-(4-piperidyl)-propionanilide (1.72 g.) were stirred together in dimethylformamide (20 ml.) and triethylamine (1.2 ml.) for six days at room temperature. The reaction mixture was then poured into ice-cooled water (500 mls) and the gummy precipitate was recrystallised from ethanol to give the title compound (1.46 g., m.p. 128°–30°C).
Analysis: Found: 77.1%C, 8.1%H, 10.8%N. $C_{25}H_{31}N_3O$ requires: 77.1%C, 8.0%H, 10.8%N.

EXAMPLE 5

1-(3-Propylinden-3-yl)-4-(N-propionanilido)-piperidine 3-(3-BRomopropyl)-indene (2.35 g.) and N-(4-piperidyl)- propionanilide (2.30 g.) were stirred togehter in dimethylformamide (20 mls) and triethylamine (1.6 mls) for 20 hours at room temperature. The reaction mixture was treated as in Example 3 to give the hydrochloride of the title compound (1.77 g., m.p. 191°–4°C).
Analysis: Found: 73.2% C, 8.0%H, 6.6%N.
$C_{26}H_{32}N_2O.HCl$ requires: 73.5%C, 7.8%H, 6.6%N.

EXAMPLE 6

N-[4-(N-propionanilido)-1-piperidylmethyl]-2-pyrrolidone

2-Pyrrolidone 1.70 g.) was dissolved in 50% ethanol (10 ml.), and formaldehyde (2.5 ml. of 40% solution) was added, followed by N-(4-piperidyl)-propionanilide (4.64 g.). The reaction mixture was then heated on a steam-bath overnight, cooled and the solvent distilled off to leave an oil. This was dissolved in ethanol, and addition of ethereal hydrogen chloride gave a precipitate which was washed with ether and dried to give the hydrochloride of the title compound (6.3 g., m.p. 177°–8°C).
Analysis: Found: 60.8%C, 7.8%H, 10.8%N.
$C_{19}H_{22}N_3O_2.HCl.½H_2O$ requires: 60.9%C, 7.8%H, 11.2%N.

EXAMPLE 7

Bis-[4-(N-propionanilido)-1-piperidyl]-methane

N-(4-Piperidyl)-propionanilide (4.64 g.) and formaldehyde (2.5 ml. of 40% solution) in 50% ethanol (10 ml.) were refluxed together for 8 hours on a steam-bath. On cooling, the solvent was distilled off, and the resulting oil was converted to the hydrochloride as in Example 6. This was recrystallised from ethanol/ether to give the hydrochloride of the title compound (0.5 g., m.p. 106°–7°C).
Analysis: Found: 61.4%C, 8.0%H, 10.1%N.
$C_{29}H_{40}N_4O_2.2HCl.H_2O$ requires: 61.4%C, 7.8%H, 9.9%N.

EXAMPLE 8

1,2-Bis-{1-(4-[N-propionanilido]-piperidyl)}-ethane.

N-(4-Piperidyl)-propionanilide (4.64 g.) and 1,2-dichloroethane (0.8 ml.) were stirred together for five days in dimethylformamide (20 ml.) and triethylamine (3.2 ml.) at room temperature. The reaction mixture was filtered and the residue stirred with water (200 ml.) for two hours and filtered again. This residue was dissolved in ethanol and ethereal hydrogen chloride added to give a white precipitate which was recrystallised from ethanol-ether to give the hydrochloride of the title compound (1.0 g., m.p. 237°–41°C).
Analysis: Found: 63.8%C, 8.0%H, 9.8%N.
$C_{30}H_{42}N_4O_2.2HCl$ requires: 63.9%C, 7.9%H, 9.9%.

EXAMPLE 9

1-[4-Acetamidophenoxy]-3[4-(N-phenyl-N-propionyl)amino piperid-1-yl]-propan-2-ol, hydrochloride, quarter hydrate.

4-Acetamido-O-(1-[2,3-epoxypropyl])phenol (4.14 g.) and 4-(N-phenyl-N-propionyl)amino piperidine were refluxed together in isopropyl alcohol (175 ml) for 24 hours. The reaction mixture was cooled to room temperature, evaporated to dryness and the residual solid recrystallised from ethanol-HCl to give the title compound (8.65 g.), m.p. 219°–222°C.
Found: C,62.31;H, 7.33; N, 8.75. $C_{25}H_{33}N_3O_4.HCl.1/4H_2O$ requires: C, 62.50; H, 7.19; N, 8.75%.

EXAMPLE 10

1-[2-(3-Indolyl)ethyl]-4-(N-phenylpropionamido)-pyridinium bromide.

3-(2-Bromoethyl)indole (6.72 g.) and 4-(N-phenyl-propionamido)pyridine (6.78 g.) were dissolved in ethanol (45 ml.) and heated under reflux for 4 hours. The title compound crystallised out on cooling and was collected and dried to give colourless leaflets (7.93 g.), m.p. 225°–9°C. Recrystallisation from ethanol raised the melting point to 234°–5°C.
Found: C, 63.73; H, 5.37; Br 17.95. $C_{24}H_{24}BrN_3O$ requires: C, 64.00; H, 5.38; Br 17.75%.

EXAMPLE 11

N-(1-[2-(3-Indolyl)ethyl]-4-piperidyl)propionanilide.

The foregoing quaternary salt (5.92 g.) was dissolved in ethanol (250 ml.) and hydrogenated in the presence of W7 Raney nickel (ca.6g) and triethylamine (2 g.) for 18 hours at 70° and 800 p.s.i. The reaction mixture was cooled, filtered and evaporated to give a foam which was dissolved in chloroform and washed with 2N sodium hydroxide solution. The aqueous layer was reextracted with chloroform (2 × 3) and the combined organic layers were dried ($MgSO_4$) and evaporated to give a brown oil. Crystallisation from acetonitrile gave the crude product (1.03 g.) m.p. 169°–171°C. Recrystallisation from acetonitrile gave the title compound as colourless prisms, m.p. 174°–176°C. (Found: C,76.93; H,7.91; N,11.34. $C_{24}H_{29}N_3O$ requires C, 76.76; H, 7.78; N, 11.19%).

EXAMPLE 12

N-[1-(2-Pyrimidyl)-4-piperidyl]propionanilide

N-(4-piperidyl)propionanilide (2.32 g.), 2-chloropyrimidine (1.15 g.) and potassium carbonate (2.8 g.) in dry dimethylformamide (15 ml.) were stirred and heated at 130° for 5 hours. The cooled reaction mixture was filtered and evaporated under reduced pressure and the residue crystallised on trituration with water to give the title compound as a quaterhydrate (2.8 g.) m.p. 135°–6°C.
(Found: C, 68.62; H, 7.04; N, 17.80. $C_{18}H_{22}N_4O.1/4H_2O$ requires C, 68.68; H, 7.20; N. 17.88%).

The products of the Examples exhibited the following pharmacological activities:

Example 1 — anti-inflammatory activity
Example 2 — hypotensive activity
Example 3 — analgesic activity with an $ED_{50}$ 0.042 M.p.k. in the rat tail flick test (40 times morphine)
Example 4 — anti-inflammatory activity
Example 5 — blood platelet aggregation inhibition
Example 6 — hypotensive activity
Example 7 — depressant activity
Example 9 — hypotensive activity, anti-oxotremorine activity
Example 10 — anti-oxotremorine activity, depressant activity
Example 11 — analgesic activity with activity greater than morphine in the rat tail flick test. Hypotensive activity.
Example 12 — depressant activity

I claim:

1. A compound selected from the group consisting of compounds having the formula

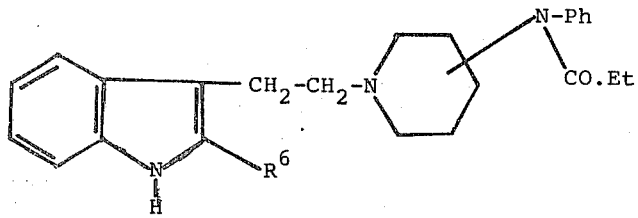

and the pharmaceutically acceptable acid addition salts of the said compounds, in which $R^6$ is selected from hydrogen and methyl.

2. A compound as claimed in claim 1, which is N-(1-[2-(3-indolyl)ethyl]-4-piperidyl)propionanilide.

3. A compound as claimed in claim 1, which is 1-[2-(2-methyl-indol-3-yl)ethyl]-4-(N-propionanilido)-piperidine.

4. 1-[2-(3-indolyl) ethyl]-4-(N-phenylpropionamido)pyridinium bromide.

* * * * *

UNITED STATES PATENT AND TRADEMARK OFFICE
CERTIFICATE OF CORRECTION

PATENT NO. : 3,869,463  
DATED : March 4, 1975  
INVENTOR(S) : John Leheup Archibald It is certified that error appears in the above-identified patent and that said Letters Patent are hereby corrected as shown below:

After "Appl. No.: 324,462" should be -- Foreign Application Priority Data

Jan. 20, 1972      United Kingdom      2721/74

In the Abstract

Line 6, "idolyl" should read -- indolyl --.

Line 10, "selected" should read -- selected from --.

Line 16, "aggregation" should read -- aggregation inhibition --.

Column 2, line 39, "these" should read -- the --.

Column 3, line 64, "with either" should read -- with --.

Column 4, line 9, "phazoderivative" should read -- phazo derivative --.

Column 5, line 40, "of" should read -- or --.

Column 7, line 15, "exylene" should read -- xylene --.

Column 9, lines 56, 57, "—$CH_2$-$CH_2$—" should read -- —$CH_2$-$CH_2$— --.

UNITED STATES PATENT OFFICE
CERTIFICATE OF CORRECTION

PATENT NO. : 3,869,463
DATED : March 4, 1975
INVENTOR(S) : John Leheup Archibald It is certified that error appears in the above-identified patent and that said Letters Patent are hereby corrected as shown below:

Column 10, line 2, "to" should read — or —.

Column 10, line 3, "reaction" should read — reactions —.

Column 10, line 53, "chet" should read — chets —.

Column 11, line 7, "of" should read — or —.

Column 11, line 27, "pionanilide" should read — pionanilido —.

Column 12, line 27, "BRomopropyl" should read — Bromopropyl —.

Column 12, line 29, "gehter" should read — gether —.

Signed and Sealed this

Eighth Day of May 1979

[SEAL]

Attest:

RUTH C. MASON
Attesting Officer

DONALD W. BANNER
Commissioner of Patents and Trademarks